United States Patent [19]

Shroyer

[11] Patent Number: 4,629,017
[45] Date of Patent: Dec. 16, 1986

[54] APPARATUS AND METHOD FOR PRODUCING WEIGHED BATCHES OF ALIGNED ELONGATED ARTICLES

[75] Inventor: David Shroyer, Aurora, Oreg.

[73] Assignee: Lamb-Weston, Inc., Portland, Oreg.

[21] Appl. No.: 714,163

[22] Filed: Mar. 19, 1985

Related U.S. Application Data

[63] Continuation-in-part of Ser. No. 376,515, May 10, 1982, Pat. No. 4,514,959.

[51] Int. Cl.$^4$ .................... G01G 19/22; B65B 57/00; B65G 47/46
[52] U.S. Cl. .................................. 177/25; 177/1; 53/77; 198/367
[58] Field of Search .................. 177/25, 1; 53/77; 198/367, 368

[56] References Cited

U.S. PATENT DOCUMENTS

| | | | |
|---|---|---|---|
| 4,203,269 | 5/1980 | Petersen | 53/77 |
| 4,465,150 | 8/1984 | Matsumoto | 177/25 |
| 4,538,692 | 9/1985 | Henry et al. | 177/25 X |
| 4,564,103 | 1/1986 | Sashiki et al. | 177/25 X |

Primary Examiner—George H. Miller, Jr.
Attorney, Agent, or Firm—Klarquist, Sparkman, Campbell, Leigh & Whinston

[57] ABSTRACT

With the method and apparatus of the present invention, a plurality of elongated articles such as french fry potatoes are separated into a plurality of groups of articles which are weighed. The weighed groups are selectively combined into a batch of articles of predetermined weight by selectively dumping scale buckets containing such groups into a common collector container to provide such weighed batch. The articles of such weighed batch are then discharged from such common collector container into one of a plurality of alignment systems mounted on a rotating common support. Each alignment system includes three vibrating conveyor stages which prealign the articles and feed such articles into an alignment container where they are aligned so that their longitudinal axes are substantially parallel in such container. The plurality of alignment systems are carried on a common support which is intermittently rotated about an axis of rotation to move the input conveyor stage into a load position beneath the output gate of the common collector container for loading. After 360 degrees rotation such alignment system is moved into an unload position where the weighed batch of aligned articles are discharged from the alignment container as a batch through a transfer tube into a packaging machine for packaging such aligned batch of articles.

20 Claims, 6 Drawing Figures

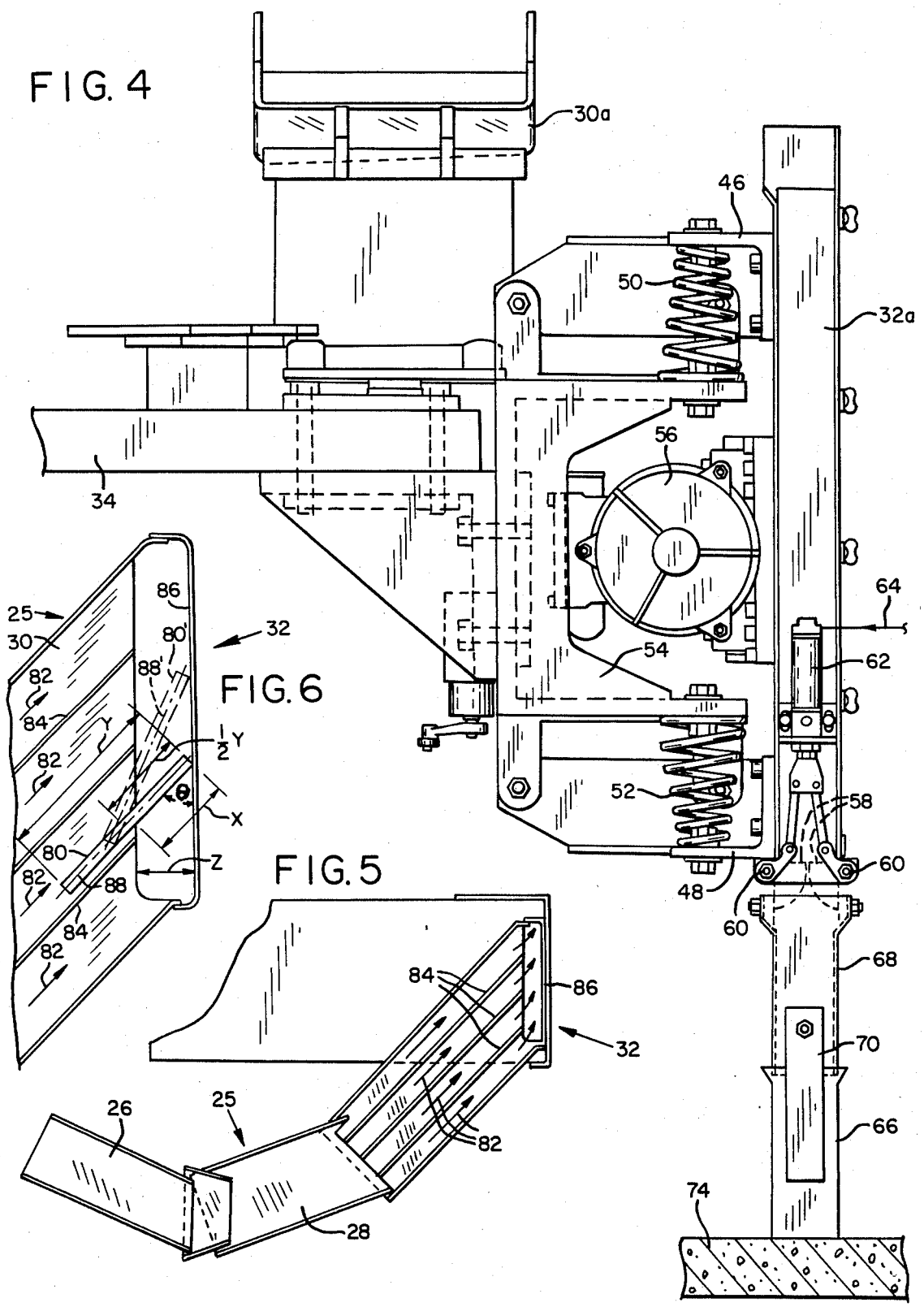

APPARATUS AND METHOD FOR PRODUCING WEIGHED BATCHES OF ALIGNED ELONGATED ARTICLES

REFERENCE TO RELATED APPLICATION

The present patent application is a continuation-in-part of pending U.S. patent application Ser. No. 376,515, filed May 10, 1982, now U.S. Pat. No. 4,514,959, entitled "Apparatus and Method for Aligning and Packaging Elongated Articles".

BACKGROUND OF INVENTION

The apparatus and method of the present invention relates generally to the separation, weighing, and selecting a combination of weighed groups of elongated articles to form a batch of articles of predetermined weight, followed by the alignment of the articles in such batch and packaging of such batch of aligned articles. In particular, the invention is related to such an apparatus and method in which successive batches of elongated articles are aligned by different alignment systems mounted on a common rotating support. Each alignment system includes a plurality of vibrating conveyor stages which prealign the articles with their axes parallel to the direction of travel before feeding them into an alignment container. The batch of articles are compacted and further aligned in the alignment container with their longitudinal axis substantialy parallel, before the aligned batch of articles is discharged from such container into a packaging machine where such batch is packaged without disturbing such alignment. The apparatus and method of the present invention is especially useful in producing weighed batches of aligned elongated food products, such as french fry potato strips.

Previously it has been proposed in U.S. Pat. No. 4,398,612 of Mikami et al issued Aug. 16, 1983 entitled "Automatic Weighing Apparatus" to provide a separator and scale apparatus for separating a plurality of articles into groups of articles which are fed into scale buckets for weighing such groups. The weighed groups of articles are automatically selectively combined by discharging some of such groups from the scale buckets into a common container chute to provide a batch of articles of predetermined weight in such chute which is discharged into a packaging machine. However, unlike the present invention, there is no alignment system for aligning elongated articles in the weighed batch of articles in the manner of the present invention.

Similar separator and scale apparatus is shown in U.S. Pat. No. 4,465,150 of Matsumoto, issued Aug. 14, 1984 and U.S. Pat. No. 4,467,880 of Minamida et al, issued Aug. 28, 1984, which are both assigned to the same assignee as the previously mentioned Mikami et al patent. This prior art apparatus employs a computer for selecting those weighed groups of articles which are combined to form a batch of predetermined weight by selectively discharging the scale buckets using computer generated gate signals as shown in U.S. Pat. No. 4,398,612 cited above.

SUMMARY OF INVENTION

It is therefore one object of the present invention to provide an improved apparatus and method for producing weighed batches of aligned elongated articles in a fast and efficient manner.

Another object of the invention is to provide such an apparatus and method with a high capacity alignment mechanism including a plurality of alignment systems mounted on a common rotating support for selectively positioning the input stage of each alignment system beneath the output of a common collector container supplying the weighed batches.

A further object of the invention is to provide such an apparatus and method in which the alignment systems each have an alignment container for aligning and compacting the elongated articles into a weighed and aligned batch of articles which is discharged from the alignment container into a packaging machine for packaging without disturbing such alignment in order to provide a compact package of aligned articles which occupy less space during shipping and storage.

An additional object of the invention is to provide such an apparatus and method in which the batches of predetermined weight are produced in an accurate and efficient manner by selectively discharging different combinations of scale buckets containing weighed groups of such articles into a common container to provide a batch of articles of a predetermined weight automatically.

Still another object of the invention is to provide such an apparatus and method in which each of the alignment systems each include a plurality of vibrating conveyor stages by which the elongated articles are prealigned with their longitudinal axes substantially parallel to their direction of travel before they are fed into the alignment container.

A still further object of the present invention is to provide such an apparatus and method in which the batch of aligned articles is transferred from a vibrating alignment container through a transfer tube to the bagging machine without jamming by providing a flexible mounted connector tube between the bottom of the alignment container and the transfer tube.

DESCRIPTION OF DRAWINGS

Other objects and advantages of the present invention will be apparent from the following detailed description of a preferred embodiment thereof, and from the attached drawings of which:

FIG. 4 is an enlarged horizontal section view taken along the line 4—4 of FIG. 3;

FIG. 5 is an enlarged view of one of the alignment systems of FIG. 3; and

FIG. 6 is an enlarged view of the output end of the alignment system of FIG. 5 showing discharge of an aligned elongated article into the alignment container.

DETAILED DESCRIPTION OF PREFERRED EMBODIMENT

Figure 1:
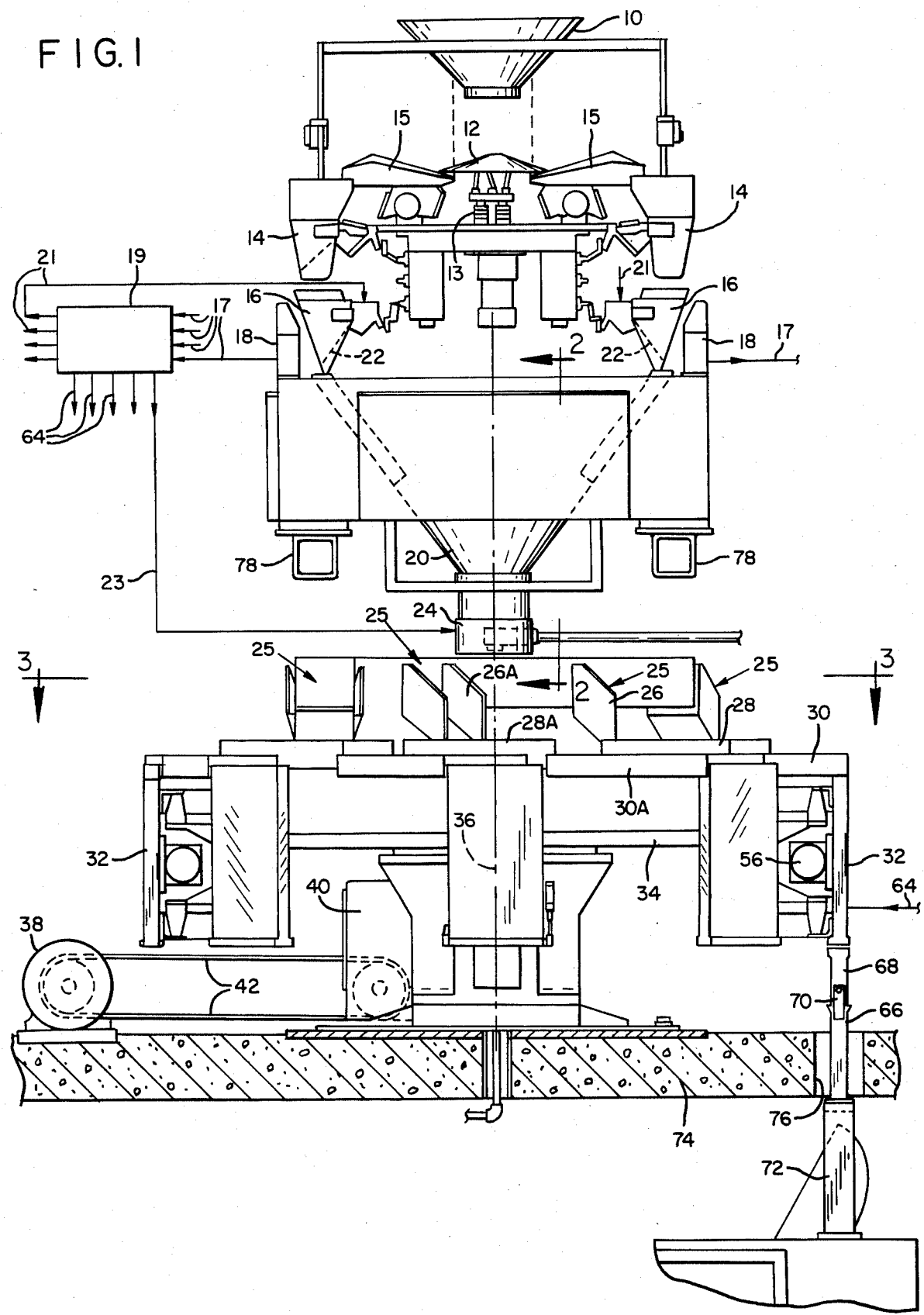
FIG. 1 is a front view of the preferred embodiment of the apparatus of the present invention.

As shown in FIG. 1, a preferred embodiment of the apparatus and method of the present invention includes a supply hopper 10 containing a supply of the elongated articles, such as french fry potato strips, or other elongated food products. The articles are discharged from the supply hopper 10 onto the upper surface of a separator cone 12 which is vibrated by a vibrating mechanism 13 in the manner described in U.S. Pat. No. 4,398,612 cited above. Upon separation by the separator cone, the articles are fed into ten separator containers 14 through associated transfer feeders 15 to form groups of articles in such separator containers. The transfer feeders 15 are also vibrated in the manner described in such patent for conveying such articles. The groups of articles in the separator containers 14 are dumped into ten different weighing containers or scale buckets 16 which are each associated with ten different electronic weighing scales 18 spaced radially outward therefrom. The electronic scales 18 each produce electrical signal corresponding to the weight of the group of articles in the bucket 16 and transmit such weight signal to an input terminal 17 of a computer 19. Computer 19 may be a digital microprocessor which processes the weight signals to produce gate control signals on outputs 21 for selectively discharging the buckets 16 into a common collector container 20 beneath such buckets. Thus, the dump gates 22 at the bottom ends of the scale buckets 16 are selectively opened by the gate control signals on computer outputs 21 in order to selectively discharge the groups of articles in such buckets in different combinations of weights which will total a predetermined weight to provide the batch of articles in the common collector container 20 in the manner of U.S. Pat. No. 4,398,612 cited above.

A batch gate 24 at the bottom of the common collector container 20 is opened by a batch output signal on a computer output 23 to discharge the batch of articles into one of eight alignment systems 25. Each of the alignment systems includes three vibration conveyor stages including an input conveyor stage 26, an intermediate conveyor stage 28 and an output conveyor stage 30. During movement along the vibrating conveyor stages, the elongated articles are prealigned with their longitudinal axes substantially parallel to their direction of travel along such conveyor stages. Each of these conveyor stages is a vibrating conveyor of the type shown in my copending U.S. patent application Ser. No. 376,515. The output conveyor stage 30 discharges the articles after they are prealigned by such conveyor stages into an alignment container 32, in a manner hereafter described with respect to FIGS. 5 and 6.

Figure 2:
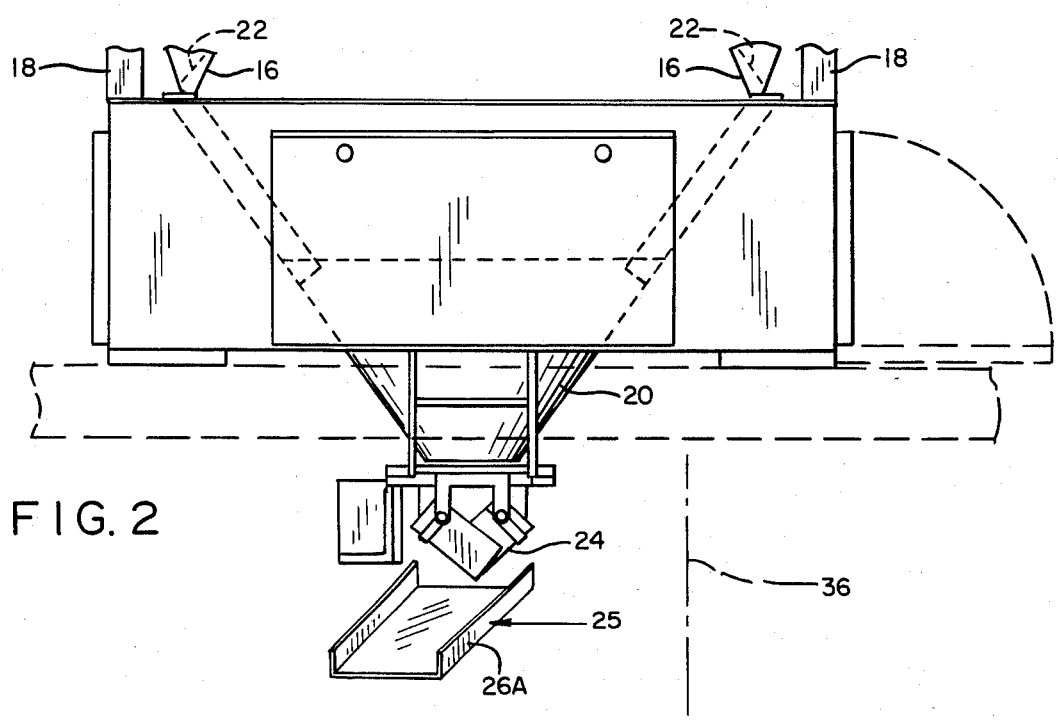
FIG. 2 is an enlarged side elevation view taken along the line 2—2 of FIG. 1.
Figure 3:
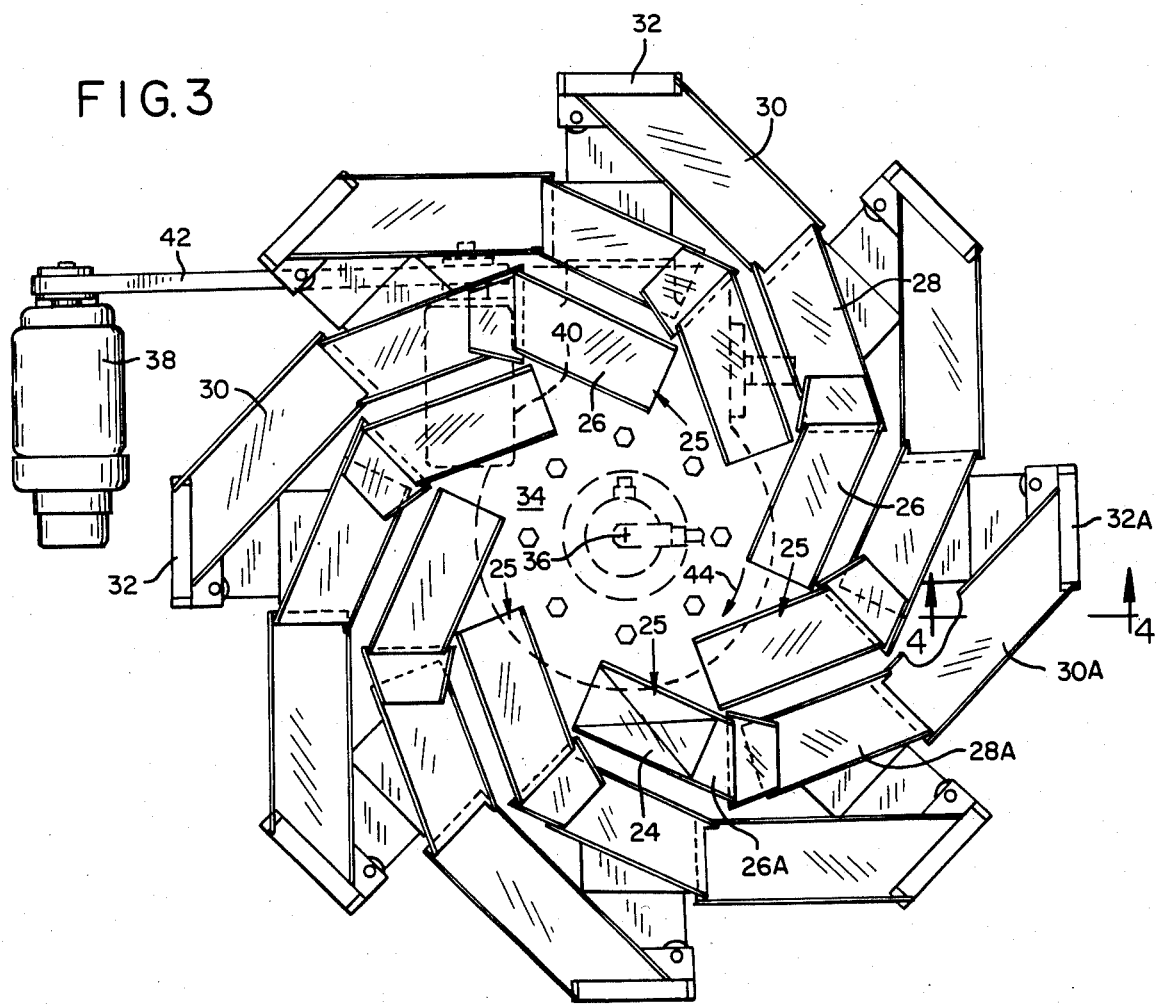
FIG. 3 is a horizontal section view taken along the line 3—3 of FIG. 1 showing a plurality of alignment systems mounted on a common rotating support beneath the outlet of the common batch container of FIG. 2.

As shown in FIGS. 2 and 3, the eight conveyor systems 25 are mounted on a common support frame 34 which is rotated about an axis of rotation 36 by an electric drive motor 38 connected to a gear train 40 by a coupling chain or belt 42. As a result, the support frame 34 and the alignment systems 25 mounted thereon rotate in the clockwise direction of arrow 44 in FIG. 3 about the axis of rotation 36 with an intermittent motion. As a result, the input stage 26A of one selected alignment system is positioned beneath the batch gate 24 of the collector container 20 in the load position. After the weighed batch of articles is dumped from the collector container 20 onto the input stage 26 of the first conveyor system, the support frame 34 and such conveyor systems are rotated 45 degrees about the axis of rotation 36 until the input stage of a second alignment system is positioned under the batch gate 24 for discharge of another batch onto the second system. The first alignment system is rotated a total of 360 degrees while it vibrates the articles on the conveyor stages 26, 28 and 30 and feeds such articles into the alignment container 32, until the alignment container of such first alignment system is in the unload position 32A shown in FIG. 3.

At this time the aligned articles are discharged as a batch from such alignment container into the bag machine, as hereafter discussed with respect to FIG. 4.

The elongated articles are transported from the input conveyor stage 26A through the intermediate conveyor stage 28A, and the output conveyor stage 30A by vibration causing such elongated articles to be prealigned with their longitudinal axis substantially parallel to their direction of travel when they reach the end of the output conveyor stage. The prealigned articles are discharged into the alignment container 32 by the time such alignment system has rotated 360° about axis 36. It should be noted that the frame 36 is provided with 45 degree intermittent rotation so that each input conveyor stage 26 of the eight conveyor systems is momentarily stopped in the load position 26A of FIG. 3 for loading of the batches. Similarly, such 45 degree intermittent rotation allows the aligned articles in the alignment container 32 of each alignment system to be discharged as an aligned batch into the bagging machine at the unload position 32A of FIG. 3.

As shown in FIG. 4, the alignment container 32 is supported by top and bottom mounting backets 46 and 48 on spring shock mounts 50 and 52 fastened to a vibrator member 54 which is vibrated by a vibration motor 56 coupled thereto. As a result, the alignment container 32 is vibrated to further compact and align the elongated articles after they are dropped from the end of output conveyor stage 30 into the top of such alignment container. A discharge gate closes the bottom of the alignment container including a pair of gate doors 58 pivotally mounted to the bottom ends of the alignment container at pivots 60. The gate doors 58 are opened by a cylinder 62 controlled by an unload signal produced by the computer 19 of FIG. 1 at an unload output 64. The weighed and aligned batch of articles is discharged from the alignement container 32A through the discharge gate 58 into a transfer tube 66, which is coupled by a connector tube 68 to the bottom of such alignment container. The transfer tube is attached to the connector tube by a flexible coupling 70, such as a rubber strip mount, which enables vibration of the connector tube 68 due to contact with the vibrating alignment container while maintaining such connector tube 68 connected to the transfer tube during discharge.

As shown in FIG. 1, a packaging mechanism having an input chamber 72 is provided in alignment with the transfer tube 66 for packaging the weighed aligned batch of elongated articles when they are transferred as a batch from the alignment container through the transfer tube into such packaging mechanism without disturbing their alignment. One suitable packaging mechanism is shown in copending application Ser. No. 376,515. The packaging mechanism 72 may be mounted beneath a base support deck 74 supporting the frame 34 for the rotating alignment systems. In this case, the transfer tube 66 extends through a passageway 76 in such deck as shown in FIG. 1. It should be noted that the scale and separator mechanism are mounted on a pair of support beams 78 above the support deck 74 with the batch gate 24 at the bottom of the collector container 20 in alignment with the input conveyor stage in load position 26A, which is displaced from the axis of rotation 36 of the alignment mechanism frame 34, as shown in FIGS. 2 and 3.

As shown in FIGS. 5 and 6, the alignment conveyor stages 26, 28 and 30 are vibrating conveyors of the type shown in my copending U.S. patent application Ser.

No. 376,515 which prealign the elongated articles 80 so that their longitudinal axes 88 are substantially parallel to their direction of travel 82 on the output conveyor stage 30. The output conveyor stage 30 is provided with a plurality of longitudinal partitions 84 which divide the output conveyor into a plurality of parallel channels each having a width W which is less than the length Y of the elongated article, as shown in FIG. 6. The output conveyor stage 30 terminates above the top of the alignment container 32 at the front edge of such alignment container, so that the elongated articles 80 traveling in the direction 82 parallel to partitions 84 strike the rear wall 86 of such container at an acute angle $\theta$ of about 45 degrees, as shown in FIG. 6. The width Z of the container 32 is equal to X sine $\theta$ where X is the distance from the front edge to the rear wall 86 of such container along the direction 82. The distance X is less than one-half the length Y of the elongated article. As a result, the elongated article 80 does not fall into the container until its front end strikes the rear wall 86 of the container.

Since the elongated articles 80 are prealigned with their longitudinal axes 88 parallel to their travel direction 82, such articles strike the rear wall 86 at angle $\theta$ and slide along the wall into the dashed line position 80' of FIG. 6 until more than half the length of such article lies over the opening of the alignment container. Then the articles fall down into such alignment container, since their center of gravity is over the top opening of such alignment container. The longitudinal axis 88' of the article 80 is thereby moved into an aligned position generally parallel to the rear wall 86 of the alignment container after such article falls into such alignment container. In addition, due to vibration of the alignment container 32 by the vibrator motor 56, a more complete parallel alignment of the longitudinal axis 88' of the articles within such alignment container takes place as well as a compacting of the articles. The result is that the articles are discharged from the bottom of the alignment container as a compact, aligned and weighed batch of articles to the packaging mechanism 72 where such batch is packaged. This is an improvement over conventional packaging of elongated articles, such as french fry potatoes, with random orientation to provide a larger package which requires much more space during shipment and storage than the packages of the aligned and weighed batches of articles produced in accordance with the present invention.

It will be obvious to those having ordinary skill in the art that many changes may be made in the above described preferred embodiment of the present invention. Therefore, the scope of the present invention should be determined by the following claims.

I claim:

1. Apparatus for producing predetermined weight batches of elongated articles and for aligning the articles in said batches, comprising:
    separator means for separating a plurality of elongated articles into groups of articles;
    scale means for weighing each of said groups of articles;
    selection means for selecting a combination of certain ones of said weighted groups to provide a combination of selected groups whose total weight is approximately equal to a predetermined weight, and for discharging said selected groups into a common container to form a batch of said articles, said batch being of said predetermined weight;
    alignment means for aligning the articles in said weighted batch in an alignment container so that the longitudinal axes of said aligned articles are substantially parallel, said alignment means including a plurality of alignment systems each having an alignment container, and including gate means for feeding the weighted batches from said common container to different ones of said alignment systems; and
    discharge means for discharging said aligned articles in a batch from said alignment container.

2. Apparatus in accordance with claim 1 which also includes packaging means for packaging said batch of aligned articles.

3. Apparatus in accordance with claim 1 in which the discharge means includes automatic gate means at the bottom of each alignment container which opens when said alignment container is moved into the unload position.

4. Apparatus in accordance with claim 1 in which the scale means includes a plurality of scales each weighing a different group of articles and transmitting an electrical output signal corresponding to the weight of said group to a data processor means for automatically controlling said selection means.

5. Apparatus in accordance with claim 1 in which said alignment systems are mounted in a carriage means for selectively positioning one of said systems at a time at a load position in communication with the output of said common container so that each system aligns a different batch of articles.

6. Apparatus in accordance with claim 5 in which the carriage means rotates to move each of said alignment systems from said load position to an unload position where the aligned articles are discharged from the alignment container by said discharge means.

7. Apparatus in accordance with claim 6 in which the alignment systems each include vibrating conveyor means for separating said articles into a plurality of parallel channels and for prealigning said articles with their longitudinal axis substantially parallel to the direction of travel of said articles along said channels before said articles are fed by said conveyor means into the alignment container.

8. Apparatus in accordance with claim 7 in which the channels terminate over the top of the alignment container and the direction of travel of the articles in said channels forms an acute angle with a back wall of the alignment container so that said articles strike the back wall and slide along said back wall into alignment generally parallel to said back wall before falling into said alignment container.

9. Apparatus in accordance with claim 7 in which the alignment container is coupled to vibrator means for vibrating said alignment container to further align and compact the articles in said alignment container.

10. Method for producing predetermined weight batches of elongated articles and for aligning said articles in said batches, comprising:
    separating a plurality of elongated articles into groups of articles;
    weighing each of said groups of articles;
    selecting a combination of certain ones of said weighted groups to provide a combination of selected groups whose total weight is approximately equal to a predetermined weight;

discharging said selected groups into a common container to form a batch of said articles, said batch being of said predetermined weight; and aligning the articles in said weighed batch so that the longitudinal axes of said aligned articles are substantially parallel by conveying the weighed batch of articles on a vibrating conveyor into an alignment container.

11. Method in accordance with claim 10 in which the articles are discharged as a batch of aligned articles from said alignment container.

12. Method in accordance with claim 11 which also includes the steps of packaging the batch of aligned articles.

13. Method in accordance with claim 11 in which the articles are conveyed into said alignment container at an acute angle to the back wall of the alignment container during the aligning step.

14. Method in accordance with claim 13 in which the alignment container is vibrated to further align and to compact the articles in said alignment container.

15. Method in accordance with claim 13 in which a plurality of alignment systems each including a vibrating conveyor and associated alignment container, are employed for aligning different weighed batches of said articles.

16. Method in accordance with claim 15 in which the alignment systems are selectively moved into a load position for loading a weighed batch of articles onto the vibrating conveyor of the selected system and into an unload position for unloading an aligned batch of articles from the alignment container of said selected system.

17. Method in accordance with claim 16 in which the alignment systems are rotated about an axis between said load and unload positions.

18. Method in accordance with claim 10 in which the articles are elongated food products.

19. Method in accordance with claim 18 in which the articles are french fry potato strips.

20. Method in accordance with claim 10 in which the selecting step is automatically done by a data processor in response to weight signals produced by scales on which said groups are weighed.

* * * * *

UNITED STATES PATENT AND TRADEMARK OFFICE
CERTIFICATE OF CORRECTION

PATENT NO. : 4,629,017

DATED : December 16, 1986

INVENTOR(S) : David Shroyer

It is certified that error appears in the above-identified patent and that said Letters Patent is hereby corrected as shown below:

Column 1, line 29, "substantialy" should be --substantially--.

Column 4, line 23, "backets" should be --brackets--.

Column 4, line 37, "alignement" should be --alignment--.

In the Claims

Claim 1, column 5, line 63, "weighted" should be --weighed--.

Claim 1, column 6, line 2, "weighted" should be --weighed--.

Claim 5, column 6, line 28, "in" should be --on--.

Claim 10, column 6, line 66, "weighted" should be --weighed--.

Claim 10, column 7, line 6, "weighted" should be --weighed--.

Signed and Sealed this

Twenty-fourth Day of March, 1987

Attest:

DONALD J. QUIGG

*Attesting Officer*  *Commissioner of Patents and Trademarks*